Patented July 28, 1953

2,647,136

UNITED STATES PATENT OFFICE 2,647,136

PREPARATION OF METHYLCHLOROSILANES

Robert O. Sauer, Schenectady, N. Y., assignor to General Electric Company, a corporation of New York No Drawing. Application January 22, 1948,
Serial No. 3,835

3 Claims. (Cl. 260—448.2)

This invention is concerned with a process for the preparation of alkylhalogenosilanes. More particularly, this invention relates to a process which comprises effecting reaction in the substantial absence of an alkyl halide at a temperature above 250° C. between (1) a preformed compound corresponding to the general formula $(R)_mSi(X)_{4-m}$ and (2) a preformed compound corresponding to the general formula $$(R')_nSi(X)_{4-n}$$

where R and R' are each lower alkyl radicals, X is a halogen (e. g., bromine, chlorine, fluorine, etc.), $m$ is one of the following: 1, 2, 3 and $n$ corresponds to one of the following: 0, 1, 2 and 3.

One of the objects of this invention is to enable one to prepare in a relatively easy manner alkyl-substituted halogenosilanes wherein different alkyl groups are attached directly to the silicon atom by carbon-silicon linkages.

Another object of the invention relates to a process for preparing more desirable alkyl-substituted halogenosilanes from less desirable alkyl-substituted halogenosilanes.

A further object of this invention is to enable an interchange of both halogens and alkyl groups to take place between different alkyl-substituted halogenosilanes to yield alkyl-substituted halogenosilanes having a different numerical configuration of alkyl groups and halogens around the silicon atom.

A still further object of this invention is to effect a dealkylation of alkyl-substituted halogenosilanes so as to yield alkyl-substituted halogenosilanes containing the grouping Si—R—Si where R is a saturated alkylene linkage, e. g., a methylene (—CH₂—) linkage.

Other objects will become more apparent as the description of this invention proceeds.

It was known heretofore that tetraethylsilane and tetrapropylsilane could be caused to react with each other to yield a reaction mixture comprising mixed ethylpropylsilanes in addition to the starting materials. Thus, Calingaert et al. have previously disclosed that the above-described reaction between tetraethylsilane and tetrapropylsilane proceeds in the presence of aluminum chloride at a temperature of the order of about 175 to 180° C. [see J. A. C. S. 62, 1104–1110 (1940); J. A. C. S. 61, 2748 (1939)]. The manner in which the ethyl and propyl groups migrated and attached to the silicon atoms was stated by Calingaert to constitute a random distribution pattern.

I have now discovered that I am able to shift both alkyl groups and halogen atoms from one silicon atom to another as the result of effecting reaction at a temperature above 250° C. between (1) a compound corresponding to the general formula $(R)_mSi(X)_{4-m}$ and (2) a compound corresponding to the general formula $(R')_nSi(X)_{4-n}$ where R and R' are each lower alkyl radicals, X is a halogen, $m$ is one of the following: 1, 2, 3, and $n$ corresponds to one of the following: 0, 1, 2 and 3.

My invention differs from the work done by Calingaert et al. in that I am able to effect not only the migration of an alkyl group, but also the migration of a halogen atom. Moreover, contrary to the random distribution encountered in the reaction disclosed by Calingaert et al., my reaction results in the establishment of an equilibrium relationship whereby the distribution of the individual components comprising the final reaction products are present in a definite and substantially predictable ratio, depending upon the starting ingredients; this equilibrium relationship is not in accord with the random distribution theory. In addition, there is the same number of carbon-silicon and silicon-halogen bonds after rearrangement as there was before. As an illlustration of this point, there may be mentioned the reaction between trimethylchlorosilane and methyltrichlorosilane which react as follows:

I    $(CH_3)_3SiCl + CH_3SiCl_3 \rightleftharpoons 2(CH_3)_2SiCl_2$

It is desired to point out that although reaction between different alkyl-substituted halogenosilanes may be effected in accordance with my claimed process disclosed in the first paragraph of this specification, redistribution of alkyl groups and halogens may also be effected where only one alkylhalogenosilane, for example, dimethyldichlorosilane, is reacted with itself at temperatures above 250° C. This will be apparent from the equilibrium relationship shown in Equation I above as well as in the examples which follow.

The manner in which the exchange of both alkyl groups and halogen atoms is caused to proceed to give reaction mixtures containing non-random concentrations of individual components is not clearly understood. However, it is believed that these unexpected results may be explained by reference to the well-known thermodynamic equation $$\Delta F = \Delta H - T\Delta S$$

by postulating that ΔH is not zero for the reactions under consideration.

In addition to effecting a rearrangement of alkyl groups and halogen atoms under the specified conditions of reaction, there also occurs a side reaction whereby dealkylation of an alkylhalogenosilane takes place with the establishment of an Si—R—Si linkage wherein R is an alkylene grouping (i. e., a bivalent hydrocarbon radical). Under preferred conditions of time and temperature, the main reaction which occurs is the redistribution of alkyl groups and halogen atoms. At temperatures of the order of 400° C. or above, in addition to the products of redistribution, from about 10 to 20 per cent of the reaction product may comprise alkylhalogenosilanes containing the aforementioned Si—R—Si grouping.

Among the compounds embraced by the aforementioned general formula $(R)_m Si(X)_{4-m}$ are e. g., methyltrichlorosilane, ethyltrichlorosilane, methyltribromosilane, butyltrichlorosilane, dimethyldichlorosilane, trimethylchlorosilane, dimethyldibromosilane, dimethyldifluorosilane, diethyldichlorosilane, triethylchlorosilane, dipropyldichlorosilane, di-isopropyldichlorosilane, tripropylbromosilane, dibutyldichlorosilane, tri-isobutylchlorosilane, amyltrichlorosilane, etc.

The compound represented by the general formula $(R')_n Si(X)_{4-n}$, in addition to being one of the alkylhalogenosilanes embraced by the formula in the preceding paragraph, may also be, for example, silicon tetrachloride, silicon tetrabromide, silicon tetrafluoride, etc.

The manner whereby my process may be practiced may be varied within wide limits. Although the reaction may be effected at atmospheric pressures, I prefer to use superatmospheric pressures in order to effect a more intimate contact between the various molecules.

The temperature at which the reaction is caused to proceed may also be varied depending upon such factors as, for example, the particular alkylhalogenosilane (or silanes) employed, whether a catalyst is used, the time of reaction, the presence or absence of pressure, etc. I have found that good results are obtained if temperatures of the order of from 250° to 500° C. or even 600° C. are employed. Temperatures above 500° C. may be employed provided shorter reaction times are used to minimize undesirable losses due to side reactions. Insufficient reaction occurs at temperatures below 250° C. either with or without a catalyst, to make the use of temperatures below 250° C. of any practical value.

The time for effecting the reaction may obviously be varied within wide limits depending on the temperature employed, the presence or absence of pressure, whether a catalyst is used in the reaction, etc. At temperatures of the order of 250° to 400° C., in the presence of a catalyst, my claimed reaction proceeds substantially to completion in from 3 to 15 or 20 hours.

Although, as stated previously, the reaction proceeds without a catalyst at elevated temperatures, I have found that aluminum chloride, preferably, though not essentially in the substantially anhydrous state, may be used to good advantage in accelerating the migration of the alkyl groups and halogen atoms at temperatures ranging from about 250° to 400° C. Surprisingly, aluminum chloride was the only catalyst found which would accelerate this reaction. Thus, other common catalysts, for example, boron trichloride, zinc chloride, iron chloride, copper chloride, etc., exerted no perceptible effect on the course of the reaction. The amount of aluminum chloride employed in the reaction may be varied widely. I have found that good results occur when from about 0.5 to 5 per cent, by weight, aluminum chloride is used, based on the total weight of the halogenosilane (or silanes) employed.

Where normal pressures are employed in conducting the reaction, the reactant or reactants are advantageously passed through a hot tube heated at the required temperatures. The aluminum chloride catalyst may be suitably employed within the tube in a manner so as to permit passage of the halogenosilane or mixtures of halogenosilanes while contacting the catalyst.

The use of pressure equipment is preferable for conducting my reaction to give more intimate contact between the coreacting molecules. Under such conditions, heating of the pressure equipment at the required temperature may cause the internal pressure to vary anywhere from about 500 p. s. i. to 2,000–3,000 p. s. i. The use of superatmospheric pressure also permits lower temperatures of reaction at slightly longer periods of time with the attendant advantage that undesirable side reactions are minimized.

It is, of course, obvious that when a single alkyl-substituted halogenosilane is employed, it is only necessary to treat this material under the stipulated conditions, either with or without a catalyst. When mixtures of halogenosilanes, e. g., trimethylchlorosilane and methyltrichlorosilane, or trimethylchlorosilane and silicon tetrachloride, etc., are employed, the proportions of these reactants may be varied within broad limits. The actual proportions will depend, for instance, on such factors as the desired product, starting materials available, etc. It will, of course, be apparent to those skilled in the art that starting mixtures containing more than two halogenosilane components may also be employed.

In order that those skilled in the art may better understand how the present invention may be practiced the following examples are given by way of illustration and not by way of limitation.

In all the following examples, unless stated otherwise, the pressure equipment employed was a 3-liter Aminco hydrogenation steel bomb which was provided with suitable arrangements whereby the bomb together with its contents could be uniformly heated at elevated temperatures.

*Example 1*

About 849 grams (7.81 mols) trimethylchlorosilane and 20 grams aluminum chloride were charged to the steel bomb. The bomb and its contents were heated at 300° C. and 775 p. s. i. for 15.3 hours. The bomb was cooled and its contents were fractionally distilled to yield 77 grams (0.60 mol) dimethyldichlorosilane, 66 grams (0.75 mol) silicon tetramethyl, and 648 grams (5.97 mols) recovered trimethyl-chlorosilane. Neither methyltrichlorosilane nor silicon tetrachloride was present.

*Example 2*

To the same steel bomb employed in the preceding example was added 855 grams (7.87 mols) trimethylchlorosilane (no catalyst). This charge was heated at 450° C. and 1575 p. s. i. for 7 hours, the product cooled and filtered. Separation of the solid matter and fractional distillation of the filtrate yielded 96 grams (0.74 mol) dimethyldichlorosilane and 621 grams (5.73 mols) trimethylchlorosilane in addition to about 61 grams (0.69 mol) silicon tetramethyl.

Example 3

In this example, 1006 grams (7.80 mols) dimethyldichlorosilane and 20 grams aluminum chloride were charged to the pressure equipment. After heating at 350° C. and 925 p. s. i. for 7 hours, fractional distillation of the product mixture yielded 92 grams (0.85 mol) trimethylchlorosilane and 126 grams (0.84 mol) methyltrichlorosilane. The remainder of the reaction product comprised unchanged dimethyldichlorosilane. No silicon tetramethyl nor silicon tetrachloride was found.

Example 4

To the same pressure equipment employed in the foregoing example were charged 417 grams (3.84 mols) trimethylchlorosilane, 576 grams (3.85 mols) methyltrichlorosilane and 20 grams aluminum chloride. After heating at 375° C. for 7 hours, fractional distillation of the reaction product gave 82 grams (0.75 mol) trimethylchlorosilane, 124 grams (0.83 mol) methyltrichlorosilane, and 713 grams (5.53 mols) dimethyldichlorosilane. Again neither silicon tetramethyl nor silicon tetrachloride was detected in the product.

The results in this example seem to indicate that the equilibrium concentrations at 375° C. of equimolecular proportions of trimethylchlorosilane and methyltrichlorosilane fall in the following ranges: $(CH_3)_3SiCl$ 10–12 mol per cent; $CH_3SiCl_3$ 10–12 mol per cent; $(CH_3)_2SiCl_2$ 78–80 mol per cent.

Example 5

To the steel reactor were added 562 grams (5.18 mols) trimethylchlorosilane, 439 grams (2.58 mols) silicon tetrachloride, and 20 grams aluminum chloride. Aafter heating at 375° C. and 1075 p. s. i. for 23.5 hours the bomb and its contents were cooled. Distillation of the reaction product gave 60 grams (0.55 mol) trimethylchlorosilane, 127 grams (0.85 mol) methyltrichlorosilane, no silicon tetramethyl and a trace of silicon tetrachloride. The balance of the distillation product comprised mainly dimethyldichlorosilane.

Example 6

About 1003 grams (7.79 mols) dimethyldichlorosilane and 20 grams aluminum chloride were charged to the pressure equipment and heated at 250° C. for 6 hours. Fractional distillation of the product yielded 4 grams trimethylchlorosilane and 15 grams methyltrichlorosilane, the balance of the charge comprising principally unchanged dimethyldichlorosilane. These results when compared with the results obtained in Example 3 establish that 250° C. is essentially the lowest practical temperature limit at which my claimed process may be practiced.

Example 7

In this example a mixture of 430 grams (3.96 mols) trimethylchlorosilane, 668 grams (3.93 mols) silicon tetrachloride, and 30 grams aluminum chloride were heated in the Aminco bomb at 375° C. and 1290 p. s. i. for 7.1 hours. Analysis of the reaction product by fractional distillation showed it to contain 12 grams (0.11 mol) trimethylchlorosilane, 118 grams (0.70 mol) silicon tetrachloride, 285 grams (1.91 mols) methyltrichlorosilane and 473 grams (3.67 mols) dimethyldichlorosilane.

Example 8

To the pressure reaction vessel were charged 993 grams methyltrichlorosilane and 20 grams aluminum chloride. After heating the vessel at 375° C. and 925 p. s. i. for 7 hours, fractional distillation of the reaction product gave a trace of silicon tetrachloride, 906 grams methyltrichlorosilane, and 30 grams dimethyldichlorosilane.

Example 9

To the pressure equipment were charged 446 grams (3.45 mols) dimethyldichlorosilane, 576 grams (3.39 mols) silicon tetrachloride, and 20 grams aluminum chloride. After heating at 375° C. and 990 p. s. i. for 17 hours the bomb was cooled and the contents fractionally distilled to yield a trace of trimethylchlorosilane, 281 grams (2.18 mols) dimethyldichlorosilane, 213 grams (1.42 mols) methyltrichlorosilane and 381 grams (2.24 mols) silicon tetrachloride.

Example 10

In this example 462 grams (3.58 mols) dimethyldichlorosilane, 595 grams (3.50 mols) silicon tetrachloride and 20 grams aluminum chloride were charged to the bomb and the contents heated at 450° C. and 1365 p. s. i. for 7 hours. Fractional distiluation of the reaction mixture gave 95 grams (0.74 mol) dimethyldichlorosilane, 490 grams (3.28 mols) methyltrichlorosilane, and 198 grams (1.16 mols) silicon tetrachloride. A considerable volume of methane was formed and at least 123 grams of residue boiling above 75° C./760 mm. was obtained.

Distillation of the 123 gram residue showed it to be comprised predominantly of bis-(trichlorosilyl) methane $(Cl_3Si-CH_2-SiCl_3)$ boiling at about 185° C. This establishes that at the elevated temperatures employed in the presence of aluminum chloride, dealkylation of methyltrichlorosilane occurred in accordance with the following equation:

$$2CH_3SiCl_3 \rightarrow Cl_3Si-CH_2-SiCl_3 + CH_4$$

This accounted for the evolution of methane during the course of the reaction.

Example 11

To a 1.3-liter Aminco hydrogenation bomb similar to that employed in the previous examples were added 530 grams (3.37 mols) diethyldichlorosilane and 10 grams aluminum chloride. The bomb and its contents were heated at 300° C. for 8 hours. Fractional distillation of the residue gave approximately 33 grams ethyltrichlorosilane, the balance of the residue comprising principally unchanged diethyldichlorosilane containing about 10 per cent triethylchlorosilane.

Example 12

To the pressure equipment described in Example 11 were charged 235.5 grams (1.50 mols) diethyldichlorosilane, 255.5 grams (1.50 mols) silicon tetrachloride, and 10 grams aluminum chloride. After heating the reaction mixture at 375° C. and 1100 p. s. i. for 7 hours, the reaction mass was fractionally distilled to yield about 36 grams (0.22 mol) ethyltrichlorosilane in addition to the unchanged silicon tetrachloride and dimethyldichlorosilane.

Example 13

To an Aminco bomb of 180 cc. capacity were charged 0.5 gram aluminum chloride and 95.6 grams of an equimolar mixture of trimethylbromosilane and methyltribromosilane (equivalent to 0.22 mol of each bromosilane component). The bomb and its contents were heated at 310-320° C. for 6 hours. Fractional distillation of the reaction product showed it to contain 8.3 grams trimethylbromosilane, 45.1 grams dimethyldibromosilane and 20.5 grams methyltribromosilane.

*Example 14*

To the pressure equipment employed in Example 1 were charged 852 grams (7.85 mols) trimethylchlorosilane and 20 grams (0.015 mol) aluminum chloride. The mixture was heated at 375° C. at 1150 p. s. i. for 7 hours. Fractional distillation of the reaction mass yielded 34 grams (0.039 mol) silicon tetramethyl, 596 grams (5.50 mols) unchanged trimethylchlorosilane, 68 grams (0.53 mol) dimethyldichlorosilane, and 95 grams of a higher boiling residue.

Fractional distillation of the aforementioned higher boiling residue showed it to be comprised predominantly of bis-(dimethylchlorosilyl)methane boiling at about 176.8° C. at atmospheric pressure (approximately 754 mm.). Analysis of the compound showed it to contain about 35.55 per cent chlorine (calculated 35.25%). This example again illustrates that in addition to effecting migration of alkyl groups and halogens, under the conditions of reaction, there also occurs a dimethylation with the subsequent establishment of a methylene bridge between the two silicon atoms.

*Example 15*

To a 1.3 liter Aminco autoclave were charged 198.5 grams (154 mols) dimethyldichlorosilane, 249.1 grams (1.53 mols) ethyltrichlorosilane, and 10 grams aluminum chloride. The bomb was closed and heated at 375° C. for 5 hours. Thereafter, 30 grams sodium chloride were added and the mixture again heated in the closed bomb at 225° C. for 3.25 hours. The bomb was cooled and the liquid product was decanted from the sodium chloroaluminate-sodium chloride cake, and the product fractionally distilled to remeove the unreacted methyltrichlorosilane, and small amounts of dimethyldichlorosilane and silicon tetrachloride. The residue which comprised a 130 gram mixture of ethyltrichlorosilane and ethylmethyldichlorosilane was converted to the respective ethoxy derivatives by treatment with absolute ethanol. This procedure yielded a fraction comprising ethylmethyldiethoxysilane having a boiling point of 140° C. and $n_D^{20}$ 1.3950. Analysis of this compound showed it to contain 51.75 per cent carbon and 11.0 per cent hydrogen (theoretical 51.81 per cent carbon and 11.18 per cent hydrogen).

In order to establish conclusively that ethylmethyldichlorosilane had been obtained, about 33 grams of the ethylmethyldiethoxysilane obtained above was added to 46 grames phosphorus tribromide and the mixture refluxed for six hours. The ethyl bromide formed was removed by distillation and essentially pure ethylmethyldibromosilane was obtained. This material had a boiling point of 139-141° C. and upon analysis was shown to contain 69.65 per cent bromine (theoretical 68.90 per cent bromine).

*Example 16*

To the pressure equipment employed in Example 1 were charged 1193 grams (8.02 mols) methyltrichlorosilane and 20 grams aluminum chloride. The bomb and its contents were heated at 450° C. for 7.0 hours. After cooling, the liquid contents were removed and subjected to fractional distillation at atmospheric pressure to yield 130 grams (0.77 mol) silicon tetrachloride, 750 grams (5.03 mols) methyltrichlorosilane and 32 grams (0.25 mol) dimethyldichlorosilane. A fraction weighing 108 grams which was collected at a vapor temperature of 176-199° C. was carefully redistilled to give a fraction boiling between 185.3 to 185.5° C. This fraction, together with a small amount of sodium chloride, was heated at 200° C. for 2 hours and redistilled to yield 39 grams of a material having a boiling point of 184.3 to 186.3° C. A chlorine analysis of this material showed it to comprise a mixture of bis-(trichlorosilyl) methane and trichlorosilylmethyldichlorosilylmethane. This example again illustrates the dealkylation, more particularly, the demethylation, effected by means of my claimed process.

*Example 17*

To the pressure reactor employed in the foregoing example were added 852 grams (7.85 mols) trimethylchlorosilane and 20 grams aluminum chloride. The reactor was closed and heated at 375° C. and 1150 p. s. i. for 7 hours. Distillation of the reaction product at atmospheric pressure gave 34 grams (0.39 mol) silicon tetramethyl, 596 grams (5.50 mols) trimethylchlorosilane, 68 grams (0.53 mol) dimethyldichlorosilane and 95 grams of higher boiling substances. Careful distillation of the high-boiling fraction yielded essentially pure bis-(dimethylchlorosilyl)methane having a boiling point of about 175.3 to 176.9° C. and showing a chlorine analysis of about 35.5 per cent (calculated 35.25 per cent chlorine).

I have also found that I can effect rearrangement of alkyl radicals and halogens attached to silicon in the presence of arylhalogenosilanes, consisting of aryl radicals and silicon and halogen atoms, wherein from 1 to 3 aryl groups are attached directly to silicon by a carbon-silicon bond. More particularly, I have found that I am able to effect the above-described reaction between (1) compounds corresponding to the general formula $(R)_uSiX_{4-u}$ where R is a lower alkyl radical, X is a halogen, and $u$ is one of the following: 2, 3, and (2) a compound corresponding to the general formula $(R'')_wSiX_{4-w}$ where R'' is an aryl radical, for example, phenyl, tolyl, xylyl, naphthyl, etc., X is a halogen, and $w$ is a value equal to one of the following: 1, 2. It should be noted in the aforementioned reaction that there is no detachment or migration of the aryl radicals, the alkyl radicals of the alkyl halogenosilanes acting as alkylating agents.

The above-described reaction is effected either with or without aluminum chloride as a catalyst at temperatures of the same order as those employed in the case where none of the coreactants contain an aryl radical attached directly to the silicon atom by a silicon-carbon bond. The following examples illustrate the reaction between phenyltrichlorosilane and either a dialkyldihalogenosilane or a trialkylmonohalogenosilane.

*Example 18*

Into a 3-liter Aminco autoclave were charged 396 grams (1.87 mols) phenyltrichlorosilane, 207 grams (1.90 mols) trimethylchlorosilane and 5 grams anhydrous aluminum chloride. This mixture was heated at 325° C. for four hours during which time the autogenous pressure rose from 500 p. s. i. to 600 p. s. i. The bomb was cooled, the contents removed, and about 30 grams sodium chloride were added thereto and the total mixture distilled until a pot temperature of 175° C. was obtained. This distillate (328 grams) was shown by analysis to comprise 16 grams trimethylchlorosilane, 60 grams methyltrichlorosilane, 201 grams dimethyldichlorosilane and 28 grams benzene.

The residue was distilled at atmospheric pressure yielding 102 grams of a liquid distilling within the boiling point range of from 190° C. to 205° C. and which contained 40.6 per cent hydrolyzable chlorine. Analysis of this liquid showed it to comprise a mixture of phenyltrichlorosilane, B. P. 201.5° C. (50.3 per cent chlorine), and methylphenyldichlorosilane, B. P. 204° C. (34.1 per cent chlorine), as evidenced by the following experiment: The mixture of chlorosilanes was converted to the corresponding ethoxy silanes by slowly adding 58.5 grams anhydrous ethanol to the chlorosilane mixture which was thereafter heated at 70-100° C. About 4 cc. dry quinoline were added to neutralize traces of acid and the mixture of ethoxy silanes distilled over a free flame. Dilution of the distillate with pentane followed by cooling caused the separation of quinoline hydrochloride which had distilled with the ethoxy silanes. Redistillation gave 50 grams of methylphenyldiethoxysilane, B. P. 217.5–223° C. (theoretical B. P. 221.5° C.). Since phenyltriethoxysilane boils at 235–237° C., the evidence established that reaction between the methylchlorosilane and the phenylchlorosilane had resulted in the formation of methylphenyldichlorosilane.

*Example 19*

Into a 1.3 liter Aminco autoclave were charged 212.5 grams (1.00 mol) phenyltrichlorosilane, 259 grams (2.01 mols.) dimethyldichlorosilane and 10 grams aluminum chloride. The autoclave was closed and heated at 350° C. (825 p. s. i.) for four hours. After cooling, 30 grams sodium chloride were added to the reaction mixture and the bomb and contents heated at 225° C. for two hours with shaking. The liquid product was decanted, filtered and fractionally distilled to yield a higher boiling portion comprising phenyltrichlorosilane and methylphenyldichlorosilane containing about 60 per cent, by weight, of the latter. This mixture was treated with absolute ethanol and then with anhydrous hydrogen fluoride to convert the chlorosilanes to the fluorosilanes. The conversion product was shaken and extracted with pentane, and the pentane removed by distillation to yield about 29 grams methylphenyldifluorosilane, B. P. 141–142° C. containing 23.5 per cent fluorine (theoretical 24.02 per cent fluorine).

*Example 20*

Into the pressure equipment described in Example 19 were charged 422 grams (1.99 mols) phenyltrichlorosilane, 313 grams (1.99 mols) diethyldichlorosilane, and 15 grams aluminum chloride. After heating at 350° C. for 4.7 hours, 30 grams sodium chloride were added and the mixture heated for an additional 3.5 hours at 225° C. The 720 grams of liquid product removed from the bomb comprised 28.2 grams (0.17 mol) silicon tetrachloride, 57.0 grams (0.73 mol) benzene, 149 grams (0.91 mol) ethyltrichlorosilane, 178.5 grams (1.13 mols) diethyldichlorosilane and 111.5 grams (0.53 mol) phenyltrichlorosilane. The residue on distillation yielded a fraction boiling between 230–268° C. This fraction was treated with absolute ethanol and anhydrous hydrogen fluoride in the same manner as described in Example 19 to yield ethylphenyldifluorosilane, B. P. 163–164° C., thus establishing the presence in the original reaction mixture of ethylphenyldichlorosilane.

My claimed process is useful in connection with the azeotropic mixture of silicon tetrachloride and trimethylchlorosilane obtained as a result of the direct reaction of silicon and methyl chloride in accordance with the process described and claimed in Rochow Patent 2,380,995, issued August 7, 1945, and assigned to the same assignee as the present invention. Great difficulty has been experienced in separating the two components of this azeotropic mixture in view of the close boiling points of the components. By means of my invention, it is now possible to utilize this azeotropic mixture by converting it to a composition containing increased amounts of methylchlorosilanes which can be more readily separated by usual distillation procedures and which have great utility as, for instance, in the preparation of resins, lubricating oils, synthetic rubbers, etc.

The dealkylated products, for example, bis-(dimethylchlorosilyl)methane (which is more particularly disclosed in my copending application Serial No. 3,836, now U. S. Patent 2,491,833, filed concurrently herewith and assigned to the same assignee as the present invention), bis-(trichlorosilyl) methane, etc., are also useful as intermediates in the preparation of resins, oils and synthetic elastomers.

What I claim as new and desire to secure by Letters Patent of the United States is:

1. The method for the production of methylchlorosilanes which comprises reacting dimethyldichlorosilane with a compound corresponding to the general formula

$(CH_3)_n Si(Cl)_{4-n}$ where $n$ is one of the following: 0, 1, at a temperature from 300° to 500° C. and under a pressure of at least about 925 pounds per square inch in the presence of aluminum trichloride.

2. The method of preparing trimethylchlorosilane which comprises reacting dimethyldichlorosilane and methyltrichlorosilane at a temperature of from 300° to 500° C. and under a pressure of at least about 925 pounds per square inch in the presence of aluminum trichloride.

3. The method for the production of methyltrichlorosilane which comprises reacting dimethyldichlorosilane and silicon tetrachloride at a temperature of from 300° to 500° C. and under a pressure of at least about 925 pounds per square inch in the presence of aluminum trichloride.

ROBERT O. SAUER.

References Cited in the file of this patent

UNITED STATES PATENTS

| Number | Name | Date |
|---|---|---|
| 2,403,370 | Hurd | July 2, 1946 |
| 2,406,605 | Hurd | Aug. 27, 1946 |
| 2,421,653 | Sauer | June 3, 1947 |

OTHER REFERENCES

Stokes, "Am. Chem. Journal," vol. 13, pages 244–53 (1891).

Ipat'ev et al., "Jour. Gen. Chemistry" (U. S. S. R.), vol. 1 (1931).

Calingaert et al., "Jour. Amer. Chem. Soc.," vol. 62, pages 1107–10 (1940).

Post, "Chemistry of Aliphatic Ortho-Esters" (1943), pages 133–136, Reinhold, N. Y., publisher.